G. VON POST.
VALVE FOR AUTOMATICALLY AND INTERMITTENTLY INTERRUPTING A CURRENT OF GAS OR LIQUID.
APPLICATION FILED APR. 25, 1908.
906,285.
Patented Dec. 8, 1908.
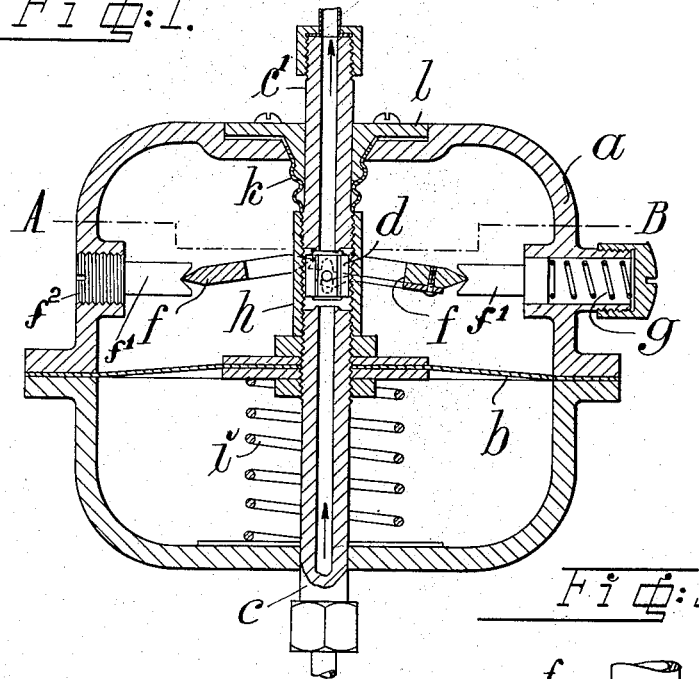
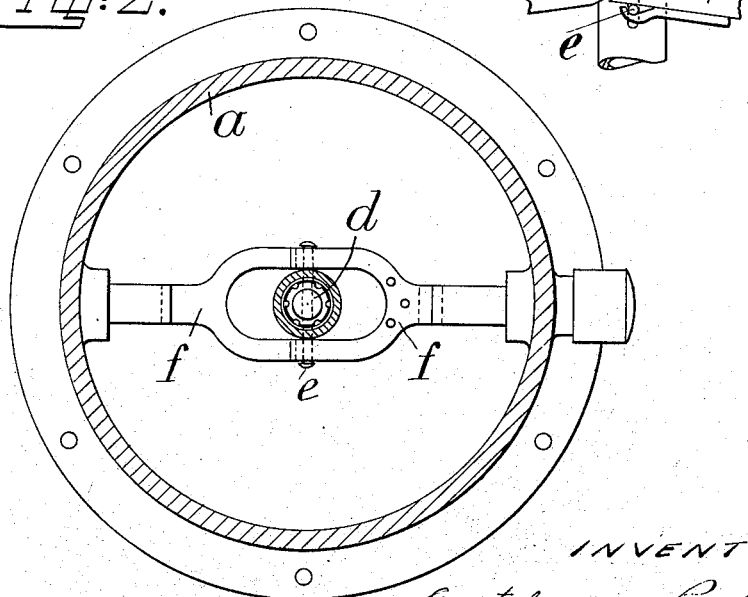

UNITED STATES PATENT OFFICE.

GUSTAF VON POST, OF STOCKHOLM, SWEDEN.

VALVE FOR AUTOMATICALLY AND INTERMITTENTLY INTERRUPTING A CURRENT OF GAS OR LIQUID.

No. 906,285.

Specification of Letters Patent.

Patented Dec. 8, 1908.

Application filed April 25, 1908. Serial No. 429,234.

*To all whom it may concern:*

Be it known that I, GUSTAF VON POST, mechanical engineer, a citizen of Sweden, residing at Fabrihsgränd 3, Stockholm, Sweden, have invented new and useful Improvements in Valves for Automatically and Intermittently Interrupting a Current of Gas or Liquid, of which the following is a specification.

My present invention relates to an improved controlling device for securing an intermittent feed of gas to flash-lights, or lights which burn with an intermittent action, and the object of the invention is to provide an extremely simple, durable, economical and efficient construction.

The invention includes the novel features of construction and arrangement and combination of parts hereinafter described and particularly set forth in the appended claims.

An embodiment of the invention is illustrated in the accompanying drawings, in which:—

Figure 1 is a central vertical section. Fig. 2 a horizontal section on line A—B of Fig. 1. Fig. 3 is a detail view.

Referring by reference characters to these figures, $a$, designates a suitable casing adapted to contain the working parts. In the lower part of the casing is located a slidable inlet pipe $c$, designed to receive the gas from any suitable source (not shown). In the upper part of the casing is located a delivery pipe $c'$, which conveys the gas to the burner, also not shown.

The inner ends of the two pipes are spaced the requisite distance apart and are connected by a sleeve $h$ having a right and left hand threaded connection so that by turning the sleeve $h$ the distance of the inner ends the two pipes $c$, $c$ may be regulated. A gas tight connection between the pipe $c'$ and the casing is maintained by an elastic collar $k$, having its upper end clamped by the packing disk $l$. The upper portion of the casing is separated from the lower by a diaphragm $b$, the outer edge of which is suitably held by the casing, while its inner edge is clamped between the disks carried by the tube $c$. The tube $c$ and diaphragm $b$; also the tube $c'$, and connecting sleeve $h$, are normally held pressed upward by a helical spring $i$. In the space within the sleeve $h$ is located the valve $d$, which has its opposite ends adapted to close the lower end of the pipe $c'$ or the upper end of the pipe $c$, according to which it is in contact with or seated upon. The sleeve $h$, is embraced by the connected arms of two toggle levers $f$, which are connected by a pivot pin $e$, which latter passes through vertical slots in the sleeve, as indicated in dotted lines in Figs. 1 and 3, and engages the valve. The toggle arms $f$, have their ends seated in bearing pieces $f'$, one of which has its head $f^2$, made adjustable as by threading it into the wall of the casing, as shown in Fig. 1. The other bearing piece $f'$, has its head guided in a recess in the opposite wall of the casing and is pressed upon by a spring $g$.

From the foregoing description it is thought that the operation of the device will be apparent, but it may be briefly stated as follows:—Assuming the parts to be in the position shown in Fig. 1, in which position the valve bears against the lower end of the pipe $c'$ and closes the same, the gas passing up through the pipe $c$, will pass out through the slotted walls of the sleeve $h$ into the space within the casing above the diaphragm and will continue to do so until sufficient pressure is resulted to force the diaphragm $b$ downward against the pressure of the spring $i$. This will carry downward with it the casing $h$ and the toggle joint, thus causing the toggle joint to straighten out. As soon, however, as the pin $e$ of the toggle joint has crossed the dead center, the spring $g$ acting on the toggle joint will cause it to move in the opposite direction, thrusting the valve suddenly down against the upper end of the pipe $c$. This will cut off the inlet of further gas and permit the gas already accumulated under pressure in the space above the diaphragm to pass out through the pipe $c$. As soon as the gas has thus passed out and the pressure above the diaphragm is reduced, the spring $i$ will raise the diaphragm until the toggle joint has crossed the dead center, when it will immediately throw the valve up again to close the lower end of the pipe $c$; cut off the passage of gas out of the chamber, and permit the passage of gas from the source of supply into the same through the pipe $c$.

Having thus described my invention, what I claim is:—

1. In a device of the class described, a casing, movable inlet and outlet pipes having a valve chamber formed between their ends, a double acting valve in said valve chamber, a spring tending to move said connected pipes in one direction, a diaphragm acted upon by gas pressure for moving the same in the opposite direction, and means for automatically shifting said valve upon the movement of said pipes a determined amount in either direction, substantially as described.

2. In combination, a gas chamber having a suitable diaphragm, movable inlet and outlet pipes, a sleeve or casing connecting the inner ends of said pipes and forming a valve chamber, a double acting valve therein, one of said pipes being connected to said diaphragm, a spring tending to move said device in one direction, and a toggle joint having its ends supported by the casing and its pivoted portion connected to said valve, substantially as described.

3. In combination, a casing, a diaphragm extending across the same, a movable inlet pipe extending through and connected to said diaphragm, a spring encircling the inlet pipe and exerting pressure on the diaphragm, an outlet pipe slidably carried by the casing, a sleeve connecting the inner ends of said inlet and outlet pipes and forming a valve chamber having communication with the space within the casing above the diaphragm, a double acting valve within said casing, a toggle lever comprising two members having forked portions pivotally connected together and to said valve member, a yielding bearing for one end of the toggle member, and an adjustable bearing for the other end, substantially as described.

In testimony whereof I have signed my name to this specification in the presence of two subscribing witnesses.

GUST. VON POST.

Witnesses:
 HJALMAR ZETTERSTROM,
 BIRGER NORDFELDT.